United States Patent [19]

Nikolskaja et al.

[11] Patent Number: 5,730,918

[45] Date of Patent: Mar. 24, 1998

[54] COMPACTED ACTIVATED CHARCOAL FILTER MATERIAL

[75] Inventors: Elena J. Nikolskaja; Natalia W. Maltzeva; Elena W. Loseva; Evgenia B. Koroljeva, all of Sankt Petersburg, Russian Federation

[73] Assignee: MST Micro-Sensor-Technologie GmbH, Hohenschaftlarn, Germany

[21] Appl. No.: 692,301

[22] Filed: Aug. 5, 1996

Related U.S. Application Data

[63] Continuation of Ser. No. 300,956, Sep. 6, 1994.

[30] Foreign Application Priority Data

Sep. 13, 1993 [DE] Germany ............... 43 30 990.9

[51] Int. Cl.$^6$ ............... B01J 20/08; B01J 20/20
[52] U.S. Cl. ............... 264/119; 264/122; 264/DIG. 48; 210/502.1; 210/503; 210/510.1; 502/415; 502/416
[58] Field of Search ............... 264/109, 122, 264/DIG. 48, 119; 502/413, 415, 416; 210/502.1, 503, 510.1

[56] References Cited

U.S. PATENT DOCUMENTS

| | | | |
|---|---|---|---|
| 4,203,962 | 5/1980 | Lippmann et al. | 264/109 |
| 4,795,735 | 1/1989 | Liu et al. | 502/415 |
| 4,963,519 | 10/1990 | Okabayashi et al. | 502/413 |

FOREIGN PATENT DOCUMENTS

| | | |
|---|---|---|
| 0343697 | 11/1989 | European Pat. Off. . |
| 0369171 | 5/1990 | European Pat. Off. . |
| 369171 | 5/1990 | European Pat. Off. . |

OTHER PUBLICATIONS

Webster's II—New Riverside University Dictionary, p. 218 "calcine"© 1984.
Abstract, Becker et al., 90–140193.
Abstract of Japan, Kazunori, No. JP60087853, vol. 9, No. 228.
Abstract of Japan, Seiji, No. JP5076754, vol. 17, No. 400.

*Primary Examiner*—James Engel
*Assistant Examiner*—Kenneth M. Jones
*Attorney, Agent, or Firm*—Felfe & Lynch

[57] ABSTRACT

Filter material in the form of activated charcoal compacts useful for selectively separating an organic phase from an inorganic phase, is prepared by a process comprising the following steps.

- A. Homogeneously blending activated charcoal particles having a particle size distribution of 1–100 μm with psuedoboehmite-configured aluminum oxide in a weight ratio of 1:1 to 5:1;
- B. Adding distilled water to the homogeneous mixture while thoroughly mixing the same;
- C. Adding dilute acetic acid to the aqueous mixture while thoroughly mixing the same;
- D. Adding more distilled water to the mixture;
- E. Compacting the resulting mixture into tablets or similar objects in a mold under pressure, and
- F. Successively heating the resulting molded objects first at 80–100° C. for 6 to 10 hours, then at 140°–160° C. for 8 to 10 hours, and finally at 180°–200° C. for 6 to 10 hours.

9 Claims, No Drawings

COMPACTED ACTIVATED CHARCOAL FILTER MATERIAL

This application is a continuation of application Ser. No. 08/300,956, filed Sep. 6, 1994 now pending.

FIELD OF THE INVENTION

The present invention relates to a method for producing compacted activated charcoal filter material, to the filter material itself, and to its use for the selective separation of organic from inorganic phases.

BACKGROUND OF THE INVENTION

There is a continuing great need for filter materials which make it possible to selectively separate organic from inorganic phases, and which are inexpensive and easy to prepare.

OBJECT OF THE INVENTION

It is therefore an object of the present invention to provide an inexpensive filter material which selectively separates organic from inorganic phases.

Other objects and advantages of the present invention will become apparent as the description thereof proceeds.

DESCRIPTION OF THE INVENTION

The above object is achieved in accordance with the present invention by the method of preparing a compacted activated charcoal filter material, which comprises the following steps:

(a) Mixing activated charcoal particles having a particle size distribution of 1–100μm with the psuedoboehmite modification of aluminum oxide in a weight ratio of 1:1 to 5:1 until the mixture is homogeneous;

(b) Adding distilled water to the homogeneous mixture while thoroughly mixing it;

(c) Adding dilute acetic acid to the aqueous mixture while thoroughly mixing the same;

(d) Adding additional distilled water thereto;

(e) compacting the resulting composition into tablets or the like in a mold under pressure; and (f) Successively heating the tablets first at 80°–100° C. for 6 to 10 hours, then at 140° C.–160° C. for 8 to 10 hours, and finally at 180° C.–200° C. for 6 to 10 hours.

The activated charcoal filter material prepared in this manner is easy and inexpensive to make and very selectively separates inorganic phases from organic phases.

In step (a) above, it is preferred to use activated charcoal particles with a particle size range of 10–50 μm. It is likewise preferred to use activated charcoal particles and aluminum oxide in a weight ratio of 1:1 to 3:1. In an additional preferred embodiment of the invention, distilled water is added in steps (b) and (d) in about equal amounts which together correspond to the weight of activated charcoal particles in the mixture.

In step (c), an aqueous 20–40% acetic acid is preferably added, such as 85% acetic acid diluted with water in a ratio of 1:3.

The compaction of the mixture into tablets or the like in step (e) is preferably performed at a pressure of 40–60 kg/cm², and especially preferably at a pressure of 50 kg/cm². The particular shape of the compacts into which the activated charcoal composition is compacted is not important. The compacts may be in any convenient shape, depending upon the ultimately intended use.

In another variant of the method according to the present invention, the activated charcoal composition is again diluted with distilled water just prior to compaction, preferably with an amount of water corresponding to approximately one third to one fifth of the amount of activated charcoal in the composition.

The compaction or molding of the composition into tablets or the like is performed at a pressure of 5–20 kg/cm², and preferably at a pressure of 10 kg/cm². All mixing operations are performed with great care.

The following example illustrates the present invention and will enable others skilled in the art to understand it more completely. It should be understood, however, that the invention is not limited solely to the particular example given below.

EXAMPLE 20 g of comminuted activated charcoal with a particle size distribution of 10–50 μm were admixed with the psuedoboehmite modification of aluminum oxide in a weight ratio of 1:1 to 3:1, and the composition was homogenized.

The homogeneous mixture obtained thereby was admixed with 10 ml of distilled water, and the aqueous mixture was combined with 10 ml of a dilute acetic acid solution obtained by diluting 3 ml of an aqueous 80% acetic acid solution with water to make 10 ml as a peptidizing agent and plasticizing agent. Thereafter, 10 ml of distilled water were added to the mixture, and the resulting composition was carefully homogenized.

The homogeneous composition was then compacted into tablets in a suitable mold at a pressure of 50 kg/cm². When the tableting operation was performed at a pressure of 10 kg/cm², the composition was again diluted with 3 to 5 ml of distilled water just prior to being introduced into the mold.

The tablets obtained in this manner were then subjected to a heat treatment, first at a temperature of 80°–100° C. for 6 to 10 hours, then at a temperature of 150° C. for 8 to 10 hours, and finally to a temperature of 180°–200° C. for 6 to 10 hours.

The resulting activated charcoal tablets were an effective filter material useful for selectively separating inorganic phases from organic phases.

While the present invention has been illustrated with the aid of a certain specific embodiment thereof, it will be readily apparent to others skilled in the art that the invention is not limited to these particular embodiments, and that various changes and modifications may be made without departing from the spirit of the invention or the scope of the attendant claims.

We claim:

1. A method of preparing compacted activated charcoal filter material, containing pseudoboehmite-configured aluminum oxide monohydrate or pseudoboehmite-configured aluminum hydroxide, the method consisting essentially of; homogeneously blending activated charcoal particles having a particle size range of 1–100μm with pseudoboehmite-configured aluminum oxide monohydrate or pseudoboehmite-configured aluminum hydroxide in a weight ratio or 1:1 to 5:1, adding distilled water to the homogeneous mixture, accompanied by thorough mixing; adding dilute acetic acid to the aqueous mixture accompanied by thorough mixing; adding additional amounts of distilled water to the resulting mixture, compacting the resulting composition into tablets in a mold under pressure, and successively heating the resulting tablets first at 80°–100° C. for 6 to 10 hours, then at 140°–160° C. for 8 to 10 hours, 180°–200° C. for 6 to 10 hours.

2. The method of claim 1, wherein the particle size distribution of the activated charcoal particles is 10–50 μm.

3. The method of claim 1, wherein the weight ratio of activated charcoal particles and psuedoboehmite-configured aluminum oxide is from 2:1 to 3:1.

4. The method of claim 1, wherein the dilute acetic acid added to the activated charcoal composition is aqueous 20–40 wt. % acetic acid.

5. The method of claim 1, wherein the tableting procedure is performed at a pressure of 40–60 $km_{force}/cm^2$.

6. The method of claim 1, wherein, when the tableting process is carried out at a pressure of 10 $km_{force}/cm^2$ the tableting composition is diluted with additional distilled water just prior to compacting it into said tablets.

7. The method of claim 1, wherein the weight ratio of the total amount of distilled water added to the activated charcoal tablet composition to the weight of activated charcoal particles in the composition is about 1:1.

8. A filter material for selectively separating organic material from an inorganic phase consisting essentially of an activated charcoal compact prepared by the method of claim 1.

9. A method of separating an organic phase from an inorganic phase, which comprises: passing a mixture of an organic phase and an inorganic phase over the filter material of claim 8.

* * * * *